United States Patent
Holling et al.

(10) Patent No.: US 7,301,462 B1
(45) Date of Patent: Nov. 27, 2007

(54) TAMPER RESISTANT ELECTRONIC TAG

(75) Inventors: Andrea N. Holling, Albuquerque, NM (US); Danny G. Butler, Stanley, NM (US); David D. Reeves, Wilson, OR (US)

(73) Assignee: TC License, Ltd., Hummelstown, PA (US)

( * ) Notice: Subject to any disclaimer, the term of this patent is extended or adjusted under 35 U.S.C. 154(b) by 475 days.

(21) Appl. No.: 10/246,456

(22) Filed: Sep. 19, 2002

(51) Int. Cl.
*G08B 13/14* (2006.01)

(52) U.S. Cl. .............................. 340/572.8; 340/572.1; 340/572.3; 340/10.1

(58) Field of Classification Search ............. 340/572.8, 340/572.1, 572.7, 572.3, 572.9, 572.5, 10.1, 340/5.8; 235/487
See application file for complete search history.

(56) References Cited

U.S. PATENT DOCUMENTS

| | | | |
|---|---|---|---|
| 3,714,644 A | 1/1973 | Hellstrom | |
| 3,848,243 A | 11/1974 | Schirmer | |
| 3,938,124 A | 2/1976 | Way et al. | |
| 3,961,323 A | 6/1976 | Hartkorn | |
| 4,233,595 A | 11/1980 | Landkammer | |
| 4,262,284 A | 4/1981 | Stieff et al. | |
| 4,447,123 A | 5/1984 | Page et al. | |
| 4,592,236 A | 6/1986 | Battagin et al. | |
| 4,811,578 A | 3/1989 | Masoncup et al. | |
| 4,811,977 A | 3/1989 | Swift et al. | |
| 4,920,334 A | 4/1990 | DeVolpi | |
| 5,189,396 A | 2/1993 | Stobbe | |
| 5,247,564 A | 9/1993 | Zicker | |
| 5,656,996 A | 8/1997 | Houser | |
| 5,986,562 A * | 11/1999 | Nikolich | 340/693.5 |
| 6,002,343 A | 12/1999 | Auerbach et al. | |
| 6,031,459 A * | 2/2000 | Lake | 340/572.8 |
| 6,067,016 A * | 5/2000 | Deschenes et al. | 340/572.8 |
| 6,121,880 A * | 9/2000 | Scott et al. | 340/572.5 |
| 6,163,260 A * | 12/2000 | Conwell et al. | 340/572.8 |
| 6,275,157 B1 | 8/2001 | Mays et al. | |
| 6,294,998 B1 * | 9/2001 | Adams et al. | 340/572.8 |

* cited by examiner

*Primary Examiner*—Anh V. La
(74) *Attorney, Agent, or Firm*—Blank Rome LLP

(57) ABSTRACT

A tamper resistant electronic tag that wirelessly receives and transmits unique subscriber information to and from a transceiver so that financial transactions can occur quickly and seamlessly. In a preferred embodiment, the tag works in conjunction with a roadway toll booth and is mounted onto a flat interior surface of a vehicle, where it can receive and transmit electronic information to and from a toll booth. That allows a driver to pay the toll fee without having to stop his vehicle. The electronic tag includes a hard plastic support case for carrying a circuit. The circuit includes an integrated circuit that is adhesively attached to the support case. The support case and circuit are then attached to the flat surface. When the support case is removed, the integrated circuit is pulled off with the support case while the rest of the circuit remains attached to the flat surface, thereby severing the circuit, and rendering it inoperable. This prevents the unwanted tampering and unauthorized use of the electronic tag.

32 Claims, 2 Drawing Sheets

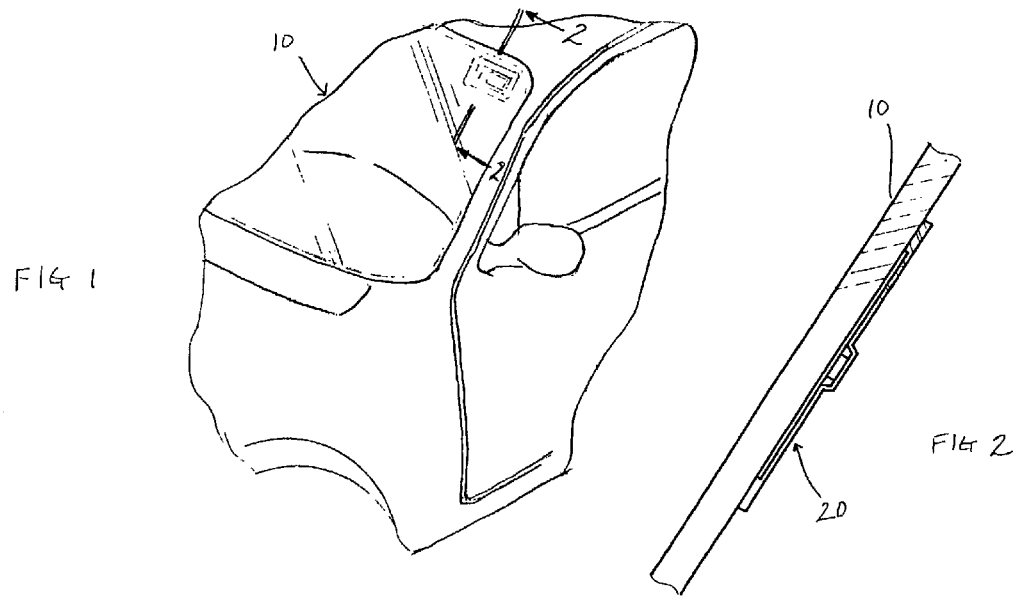
FIG 1
FIG 2
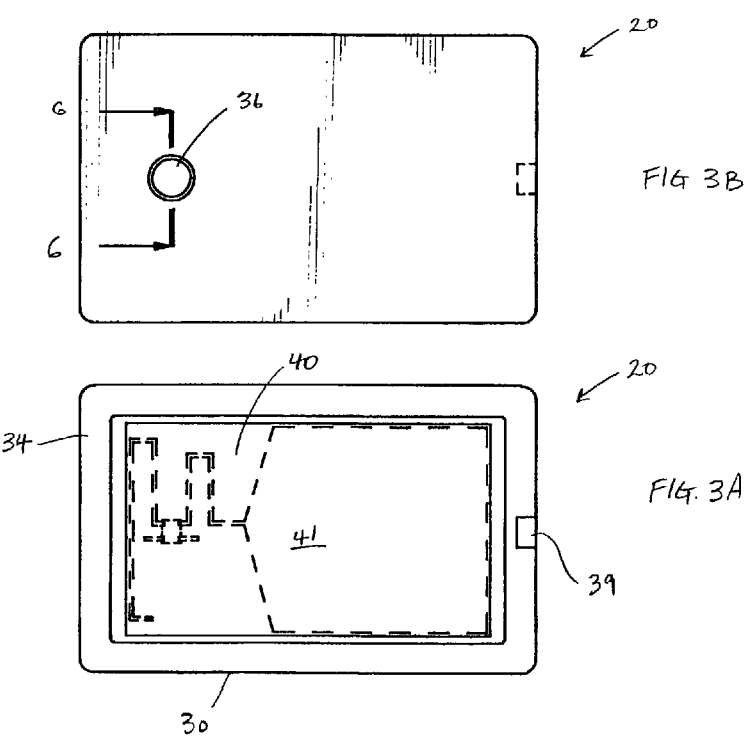
FIG 3B
FIG 3A

TAMPER RESISTANT ELECTRONIC TAG

FIELD OF INVENTION

The present invention is directed to a tamper resistant electronic tag that attaches to the inside of an automobile, preferably the front windshield, so that unauthorized removal of the tag will render the tag inoperable. The tag is preferably part of a highway toll collection system that allows a vehicle to automatically pay toll fees, by transmitting a signal incorporating unique subscriber information to a transceiver at a toll booth so that the vehicle may pass through the toll booth without having to stop the vehicle. The tag may also be used for other RF-identification applications, such as in parking facilities, vehicle registration and retail stores. Additionally, the tag may provide RF-identification for security and access control applications.

BACKGROUND OF THE INVENTION

Toll booths for collecting fees along heavily trafficked highways and roadways is a common practice for generating revenue for many jurisdictions. In order to facilitate the quick and efficient collection of these fees and to prevent "bottlenecking" at the toll booths, many jurisdictions have incorporated wireless electronic tags that seamlessly transmit subscriber information to a transceiver at the toll booth, which then automatically deducts the appropriate fees from an existing account established by the tag owner. In that way, a driver may simply pass a toll booth and have the appropriate fees paid without having to bring his vehicle to a stop.

The electronic tags are typically small portable units that are placed inside a vehicle so that when a toll booth is passed, the tag retransmits signals to a transceiver at a toll booth. Oftentimes, the tags are attached to a front windshield of a vehicle so that its signal to the toll booth is unobstructed. However, this often leaves the tag in open view making it highly susceptible to theft.

One solution to this problem is to embed the electronic tag in between two layers of glass in a vehicle's windshield, as disclosed in U.S. Pat. No. 6,275,157 to Mays et al. This prevents unwanted tampering, but also bars access to the tag. If the tag malfunctions or otherwise becomes inoperative, or if the vehicle is sold, it is impossible to access the tag without destroying the windshield. Therefore, it would be advantageous to provide a electronic tag that can be accessed or removed from a vehicle. It would also be advantageous to provide an electronic tag that can be accessed without having to destroy or break portions of the vehicle.

SUMMARY AND OBJECTS OF THE INVENTION

It is an object of the present invention to provide an electronic tag that transmits subscriber information to allow quick and efficient financial transactions to occur. It is a further object of the present invention to provide a tag that can be attached to a surface, particularly a vehicle's windshield, to prevent unauthorized tampering with the tag. It is still a further object of the present invention to provide an electronic tag that will become inoperable when tampered with.

The present invention is directed to a tamper resistant electronic tag that wirelessly retransmits subscriber information to a transceiver when interrogated, so that financial transactions can occur quickly and seamlessly. A preferred embodiment mounts the tag onto a relatively flat surface, typically the front windshield of a vehicle, where it receives an interrogation signal from a "reader" system and retransmits a modified signal carrying subscriber information back to the reader system.

The tag includes a hard plastic support case for supporting a circuit. The plastic support case is generally flat, rectangular shaped laminate having a depression therein for holding the circuit. The circuit includes an integrated circuit or microchip which is attached to the support case with an adhesive. The support case and the circuit are then attached to the windshield with an adhesive, so that the support case holds the circuit against the windshield, protecting and limiting access to the circuit. When the support case is removed from the windshield, the integrated circuit is separated with the support case while the rest of the circuit remains attached to the windshield, thereby severing the circuit and rendering it inoperable.

With these and other objects, advantages and features of the invention that may become hereinafter apparent, the nature of the invention may be more clearly understood by reference to the following detailed description of the invention, the appended claims and to the several drawings attached herein.

BRIEF DESCRIPTION OF THE DRAWINGS

FIG. 1 is a perspective view drawing of an electronic tag of the present invention attached to a windshield of a vehicle;

FIG. 2 is a side view drawing of the electronic tag attached to the windshield of a vehicle along line 2-2 of FIG. 1;

FIG. 3A is a top view drawing of the electronic tag;

FIG. 3B is a bottom view drawing of the electronic tag;

DETAILED DESCRIPTION OF THE INVENTION

Referring now in detail to the drawings, FIGS. 1 and 2 show an electronic tag 20 of the present invention mounted on the inside of a vehicle's front windshield 10. The tag 20 can be mounted anywhere inside the vehicle, but the front windshield 10 provides a preferred location because it permits a clear and unobstructed path for signals to be sent between the tag 20 and a data processing station (not shown). In addition to being mounted onto the windshield 10, the tag 20 may be imbedded into the windshield 10 of new cars.

In a preferred embodiment of the invention, the tag 20 is used in conjunction with roadway toll booths, so that subscriber information can be relayed to the toll booth and the proper fee electronically paid without having to stop the vehicle. However, it is also envisioned that the tag 20 be used in a variety of other environments to eliminate cash transactions, thereby increasing the speed and efficiency at which these financial transactions can occur. For example, it is contemplated that the tags be used in conjunction with fast food drive-throughs, gas stations, parking facilities, or any other location where cash is exchanged. Additionally, the tag is not limited to the transfer of electronic financial information, but can be used to transfer any information which needs to be quickly and accurately relayed. The tag 20 also provides a level of security for these transactions by limiting the access to the tag 20, thereby preventing their fraudulent use.

In operation, the electronic tag 20 receives an interrogation signal from a toll booth reader/transceiver via a paddle antennae 44. The signal is communicated to an integrated circuit 42, which modulates the signal to incorporate unique subscriber information, and is retransmitted back to the toll booth reader/transceiver. The signal is then de-modulated and decoded at the reader/transceiver to obtain the subscriber information and attend to payment of the necessary fee. In the embodiment shown, the electronic tag 20 is powered by energy conveyed in the interrogation signal sent by the transceiver. However, a separate power source, such as a battery or solar cell, may be provided on the electronic tag 20 without departing from the scope of the invention.

Figure 4:
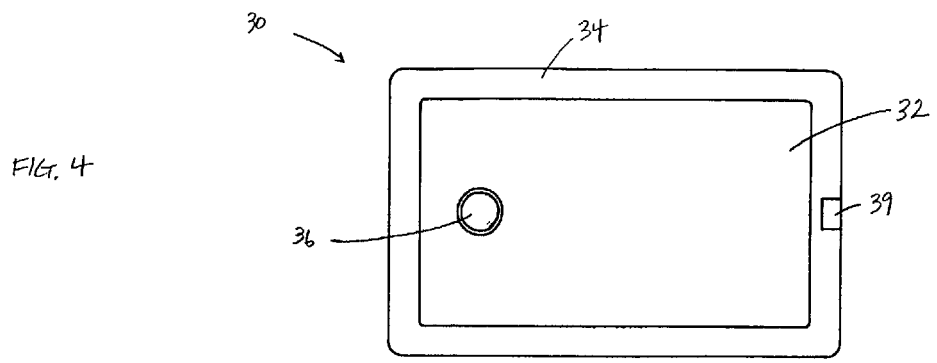
FIG. 4 is a top view drawing of a plastic support case.
Figure 5:
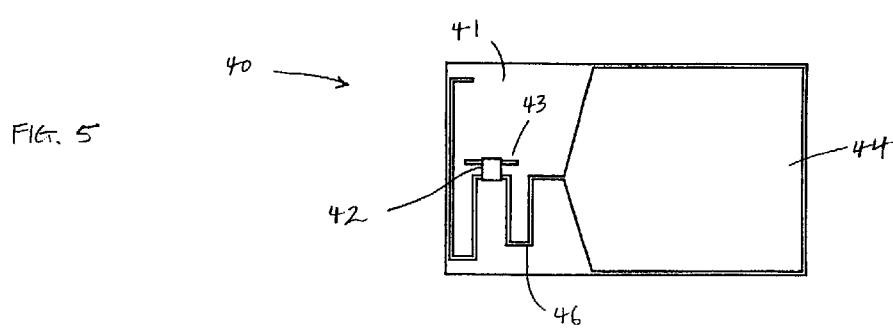
FIG. 5 is a bottom view drawing of a flexible circuit sheet.

The electronic tag 20 includes a relatively rigid plastic support case 30, shown in FIG. 4, and a flexible circuit sheet 40, shown in FIG. 5. FIG. 4 shows a top view of the support case 30, which is a generally flat, rectangular-shaped laminate having a center depression 32. The depression 32 defines a border 34 around the circumference of the support case 30. A circular-shaped recess 36 is located at one end of the support case 30, and has a depth greater than the depth of the depression 32 to accommodate the thickness of the integrated circuit 42, as explained below.

FIG. 5 shows a bottom surface of the circuit sheet 40. The circuit sheet 40 is made of a flat flexible substrate 41, the bottom surface of which contains the circuit 46, including the integrated circuit 42 and the paddle antennae 44. When assembled, the bottom of the circuit sheet 40 is placed against the top surface of the support case 30, so that the circuit 46 is protected between the support case 30 and the substrate 41. Typically, the integrated circuit 42 has a thickness greater than that of the rest of the circuit 46 and is therefore placed within the recess 36, while the remainder of the circuit lies flat against the depression 32. An assembled electronic tag 20, showing its top and bottom surfaces is shown in FIGS. 3A and 3B, respectively.

The term "integrated circuit" as used herein is not intended to limit the invention to the embodiment disclosed in the figures, but rather encompasses a variety integrated circuit packages, such as a bare chip with a wire bond or a flip chip.

Figure 6:
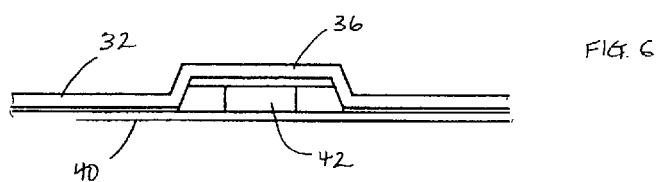
FIG. 6 is a side view drawing of the electronic tag along line 6-6 of FIG. 3A.
Figure 7:
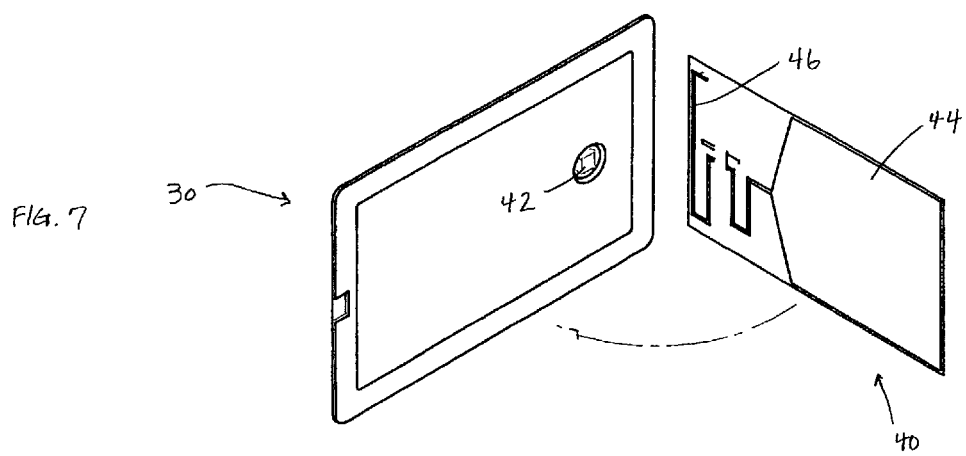
FIG. 7 is a perspective view drawing of a severed circuit sheet.

FIG. 3A shows the top of the electronic tag 20, with the substrate 41 lying within the depression 32 of the support case 30 and providing a relatively smooth top surface. The circuit 46 is on the other side of the substrate 41 and is shown in the figure in dotted lines. The circuit sheet 40 is attached to the support case 30 using a adhesive, typically at two locations. First, the integrated circuit 42 is attached to the recess 36 using a relatively strong adhesive, and second, the paddle antennae 44 is attached to the depression 32 using a relatively weak adhesive. FIG. 3B shows the bottom of the electronic tag which shows the recess 36 forming a outward protrusion, which is shown in greater detail in FIG. 6.

The assembled electronic tag 20 is attached to a relatively flat surface in a vehicle, preferably a vehicle's front windshield 10, as shown in FIGS. 1 and 2. Looking at the top of the electronic tag 20 in FIG. 3A, a strong pressure sensitive adhesive is applied to the top surface of the substrate 41 and around the border 34 of the support case 30. The electronic tag 20 is then pressed against the windshield 10 so that the support case 30 and circuit sheet 40 are adhesively bonded to the windshield 10. It should be understood that although the electronic tag 20 is described here in reference to a front windshield 10, it can be placed against any surface in a car where electronic signals can be sent and received from a toll booth.

The anti-tampering feature of the electronic tag 20 will now be explained. After the electronic tag 20 is bonded to the windshield 10, removal of the electronic tag 20 will sever the circuit 46 and render the tag inoperable. That is because as the support case 30 is removed from the windshield 10, the strong adhesive attaching the substrate 41 to the windshield 10 keeps the substrate 41 attached to the windshield 10, separating the weaker bond between the paddle antennae 44 and the support case 30. Furthermore, because the integrated circuit 42 is attached to the recess 36 with a strong bond, the integrated circuit 42 remains attached to the recess 36 and separates from the substrate 41. The separation of the integrated circuit 42 from the substrate 41 severs the circuit 46 and renders the electronic tag 20 inoperable.

Typically, the integrated circuit 42 is soldered to the substrate 41 and the solder points provide weak connections to the circuit sheet 40 so that the integrated circuit 42 is severed relatively easily. However, it is envisioned that the invention include other means of attaching the integrated circuit 42 to the substrate 41, such as wire bonding or conductive adhesive bonding.

For the anti-tampering feature of the electronic tag 20 to function properly, the circuit 46 must be severed when the support case 30 is removed from the windshield. In the preferred embodiment described above, the integrated circuit 42 remains bonded to the support case 30 when the support case 30 is removed, leaving the remainder of the circuit 46 attached to the windshield 10. However, it should be understood that any combination of adhesive bond strengths and adhesive locations may be used so long as the circuit 46 is severed upon removal of the support case 30. For example, rather than having the integrated circuit 42 attached to and removed with the support case 30 as described above, the electronic tag 20 may have the paddle antennae 44 or some other portion of the circuit 46 attached to support case 30 and removed therewith, leaving the integrated circuit 42 attached to the windshield 10. Additionally, it is envisioned that the circuit 46 is directly attached to the windshield and removal of the support case 30 would sever the circuit 46. The invention is intended to encompass any structure where upon removal of the support case 30, the circuit 46 is severed and renders the tag inoperable.

Although the electronic tag 20 will become inoperable when removed from the windshield 10, there will be times when it is desirable to remove the tag 20, such as when the vehicle is sold or the tag is no longer needed. Therefore, a notch 39 is provided on the support case 30 which aids in the removal of the electronic tag 20 from the windshield 10. A screwdriver or other similar device can be inserted into the notch 39 to help pry the support case 30 off the windshield 10.

Although certain presently preferred embodiments of the present invention have been specifically described herein, it will be apparent to those skilled in the art to which the invention pertains that variations and modifications of the various embodiments shown and described herein may be made without departing from the spirit and scope of the invention. Accordingly, it is intended that the invention be limited only to the extent required by the appended claims and the applicable rules of law.

The invention claimed is:

1. A tamper resistant electronic tag comprising:
   a support case having a first and second side;
   a circuit sheet having a first and second side, the second side of the circuit sheet having a circuit, and the circuit including an integrated circuit;
   wherein a portion of the circuit is adhesively attached to the first side of the support case; and
   wherein said first side of circuit sheet is adhesively attached to a surface, such that if the support case is removed from the surface, the circuit sheet remains attached to the surface and the portion of the circuit attached to the support case is removed with the support case and is severed from the circuit sheet, rendering the electronic tag inoperable.

2. The tamper resistant electronic tag of claim 1, wherein:
   said support case includes a recess, and the integrated circuit is placed within the recess so that the first side of the support case and the first side of the circuit sheet present a generally flat surface.

3. The tamper resistant electronic tag of claim 1, wherein:
   the portion of the circuit attached to the support case is the integrated circuit, so that removal of the support case severs the integrated circuit from the circuit.

4. The tamper resistant electronic tag of claim 1, wherein:
   the electronic tag is attached to a flat surface in a vehicle.

5. The tamper resistant electronic tag of claim 1, wherein:
   the circuit includes an antenna electrically connected to the integrated circuit, the antennae being capable of sending and receiving electronic information.

6. The tamper resistant electronic tag of claim 1, wherein:
   the circuit sheet comprises a flexible substrate onto which the circuit is attached.

7. The tamper resistant electronic tag of claim 1, wherein:
   the first side of the support case includes a notch for aiding the removal of the support case from the surface.

8. A tamper resistant electronic tag for sending and receiving electronic information, comprising:
   a support case having a first side and a second side; and
   a substrate having a first and second side, said substrate including a circuit with an integrated circuit on the second side, wherein a portion of said circuit is attached to the support case;
   wherein the first side of the substrate is attached to a surface such that if the support case is removed from the surface, the substrate remains attached to the surface and the portion of the circuit attached to the support case is removed with the support case, thereby severing the circuit.

9. The tamper resistant electronic tag for sending and receiving electronic information of claim 8, wherein:
   the integrated circuit is attached to the support case and removing the support case severs the integrated circuit from the remainder of the circuit.

10. The tamper resistant electronic tag for sending and receiving electronic information of claim 9, wherein:
    said support case includes a recess and the integrated circuit is placed within the recess so that the first side of the support case and the first side of the substrate presents a generally flat surface.

11. The tamper resistant electronic tag for sending and receiving electronic information of claim 10, wherein:
    said support case further includes a depression for holding the substrate so that the first side of the substrate and the first side of the support case is generally flat.

12. The tamper resistant electronic tag for sending and receiving electronic information of claim 11, wherein:
    the circuit includes a generally flat antennae electrically connected to the integrated circuit, the antennae being able to send and receive electronic information.

13. The tamper resistant electronic tag for sending and receiving electronic information of claim 12, wherein:
    the first side of the support case includes a notch for aiding the removal of the support case from the surface.

14. The tamper resistant electronic tag for sending and receiving electronic information of claim 8, wherein:
    the integrated circuit is able to receive and modify a signal to incorporate information into the signal.

15. The tamper resistant electronic tag for sending and receiving electronic information of claim 8, wherein:
    wherein the electronic tag is attached to an interior surface inside a vehicle.

16. A tamper resistant electronic tag for sending and receiving electronic information, comprising:
    a support case and a substrate, said substrate including a circuit with an integrated circuit on the second side;
    wherein one of the substrate or a portion of the circuit is bonded to the support case and the other one of the substrate or portion of the circuit is bonded to a surface such that if the support case is removed from the surface, the substrate or portion of the circuit remains bonded to the surface and the other of the substrate or the portion of the circuit is removed with the support case, thereby severing the circuit.

17. The tamper resistant electronic tag for sending and receiving electronic information of claim 16, wherein:
    said support case includes a recess and the integrated circuit is placed within the recess so that the support case and the substrate present a generally flat surface.

18. The tamper resistant electronic tag for sending and receiving electronic information of claim 16, wherein:
    the circuit includes a generally flat antennae electrically connected to the integrated circuit, the antennae being able to send and receive electronic information.

19. The tamper resistant electronic tag for sending and receiving electronic information of claim 16, wherein:
    the integrated circuit is able to receive and modify a signal to incorporate information into the signal.

20. A tamper resistant electronic tag for sending and receiving electronic information, comprising:
    a support case and a circuit;
    the circuit including an integrated circuit, wherein a portion of said circuit is attached to the support case and another portion of the circuit is attached to a surface; and
    wherein if the support case is removed from the surface, the portion of the circuit attached to the support case is severed from the portion of the circuit attached to the surface.

21. The tamper resistant electronic tag for sending and receiving electronic information of claim 20, wherein:
    said support case includes a recess and the integrated circuit is placed within the recess so that the support case and the substrate present a generally flat surface.

22. The tamper resistant electronic tag for sending and receiving electronic information of claim 20, wherein:
    the circuit includes a generally flat antennae electrically connected to the integrated circuit, the antennae being able to send and receive electronic information.

23. The tamper resistant electronic tag for sending and receiving electronic information of claim 20, wherein:
    the integrated circuit is able to receive and modify a signal to incorporate information into the signal.

24. The tamper resistant electronic tag for sending and receiving electronic information of claim 20, wherein:
    the integrated circuit is soldered to the circuit.

25. A tamper resistant electronic tag for sending and receiving electronic information, comprising:
    a support case and a circuit;

wherein the support case and circuit are attached to a surface such that if the support case is removed from the surface, a portion of the circuit remains attached to the support case and another portion of the circuit remains attached to the surface, thereby severing the circuit.

26. The tamper resistant electronic tag for sending and receiving electronic information of claim 25, wherein:
the circuit includes an integrated circuit and an antenna.

27. The tamper resistant electronic tag for sending and receiving electronic information of claim 26, wherein:
the electronic tag is attached to a vehicle.

28. A method of using a tamper resistant electronic tag comprising the steps of:
providing an electronic tag having a support case and a circuit sheet, said circuit sheet having a circuit, a portion of which is attached to the support case;
attaching said circuit sheet to a surface so that the circuit sheet is located between the support case and the surface, wherein removing the support case from the surface removes the portion of the circuit attached to the support case, while the circuit sheet and remaining portion of the circuit is attached to the surface, thereby severing the circuit and rendering it inoperable;
receiving an interrogation signal from a transceiver; and
retransmitting a signal incorporating subscriber information back to said transceiver.

29. The method of using a tamper resistant electronic tag of claim 28, wherein:
the circuit is adhesively attached to the support case and the circuit sheet is adhesively attached to the surface.

30. The method of using a tamper resistant electronic tag of claim 28, wherein:
the circuit includes an integrated circuit, the integrated circuit being adhesively attached to the support case, so that removal of the support case from the surface severs the integrated circuit from the circuit.

31. The method of using a tamper resistant electronic tag of claim 30, wherein:
the support case is a generally flat rigid sheet having a recess therein to accommodate the placement of the integrated circuit so that the circuit can lie flat against the support case.

32. The method of using a tamper resistant electronic tag of claim 28, wherein:
the electronic tag is attached to an interior surface of a vehicle.

* * * * *